United States Patent [19]

Meuron et al.

[11] Patent Number: 5,018,685
[45] Date of Patent: May 28, 1991

[54] DATA LINK AND RETURN LINK

[75] Inventors: Bruce R. Meuron, Willow Grove; Joseph B. Lyons, Jr., Philadelphia, both of Pa.

[73] Assignee: The United States of America as represented by the Secretary of the Navy, Washington, D.C.

[21] Appl. No.: 370,741

[22] Filed: May 27, 1964

[51] Int. Cl.⁵ .............................................. F41G 7/00
[52] U.S. Cl. ................................ 244/3.14; 178/69 A; 244/14; 342/14
[58] Field of Search ...................... 325/30, 58; 178/69, 178/69.5, 22; 179/15; 340/172.5, 171; 235/150; 244/14

[56] References Cited

U.S. PATENT DOCUMENTS

| | | | |
|---|---|---|---|
| 2,792,190 | 5/1957 | Siefold | 244/14 |
| 2,861,179 | 11/1958 | Jacob | 244/14 |
| 2,934,604 | 4/1960 | Biget | 178/69.5 |
| 2,980,858 | 4/1961 | Brandin | 328/155 |
| 2,993,089 | 7/1961 | Negri | 178/22 |
| 3,037,568 | 6/1962 | Hannen | 179/15 |
| 3,038,028 | 6/1962 | Henge | 178/22 |
| 3,053,478 | 9/1962 | Davenport et al. | 244/14 |
| 3,069,657 | 12/1962 | Greer et al. | 340/171 |
| 3,095,539 | 6/1963 | Bennett et al. | 325/163 |
| 3,099,795 | 7/1963 | Frank | 325/30 |
| 3,099,796 | 6/1963 | Zadaff | 325/30 |
| 3,110,862 | 11/1963 | Chasek | 325/30 |
| 3,113,291 | 12/1963 | Friske | 340/23 |
| 3,117,305 | 1/1964 | Goldberg | 340/171 |
| 3,119,964 | 1/1964 | Arefts | 325/130 |
| 3,121,197 | 2/1964 | Irland | 325/130 |
| 3,180,927 | 4/1965 | Heppe | 178/5.1 |

Primary Examiner—Nelson Moskowitz
Attorney, Agent, or Firm—James V. Tura; James B. Bechtel; Susan E. Verona

[57] ABSTRACT

This invention relates to a data coder, code searching mechanism, data decoder, and range computer for a missile wherein the missile receiver is able to discriminate between the real signals and jamming signals. The system provides discrimination in aircraft receiver systems for the return synchronization signal. This is accomplished by utilizing a random code generator wherein the command data signals modulate the code train which in turn modulates the RF carrier. The missile contains a second code generator with a code searching mechanism which synchronizes the second code generator with the first generator. The comparison of the second code generator signal with the received signal produces the command signal as an output.

14 Claims, 4 Drawing Sheets

DATA LINK AND RETURN LINK

The invention described herein may be manufactured and used by or for the Government of the United States of America for governmental purposes without the payment of any royalties thereon or therefor.

This invention relates to a command data link for a missile.

In the Condor missile system an air-to-ground missile is launched from an aircraft which then stands off from the target a considerable distance, anywhere from 40 to 100 miles or more. In order to guide the missle correctly from the aircraft it is necessary to have contact with the missile over a wide distance and also to know how far from the aircraft the missile is at any momemt. Prior aircraft-to-missile communication systems have suffered by being susceptile to jamming, i.e., signals similar to those issued by the aircraft or by the missile have been issued by unfriendly jammimg stations which resulted in false signals being given to the missile or the aircraft or both.

The present invention provides a dara coder, code searching mechanism, data decoder, and range computer for a missile by which the missile receiver system is able to discriminate to a very high degree between the real signals and spurious jamming signals. It further provides discrimination in the aircraft receiver system for the return synchronization signal. To accomplish this, the aircraft utilizes a random code generator in which command data signals modulate the code train, which in turn modulates the r-f carrier. The missile contains a second code generator with a code searching mechanism which synchronizes the second code generator with the first generator. Then comparison of the second code generator signal with the received signal produces the command signal as an output. The code generator in the missile also transmits its code back to the aircraft where this signals is synchronized with a third code generator. A spurious signal which does not match the code of the aircraft or missile will be ignored by the code searching mechanisms in both the aircraft and missile. The third code train is then compared in phase with the first generated code train and the difference in time between the two is the length of time that it takes a signal to travel from the aircraft to the missile and back to the aircraft.

Accordingly, it is an object of the present invention to provide subsystems in an aircraft-to-missile communication system which by coded signals provides a high degree of immunity to jamming signals.

Another object of the invention is to provide a coder capable of translating command data signals into a code train.

Yet another object of the invention is to provide a decoder capable of translating a code train into command data signals.

Another object of the invention is to provide a code searching mechanism in the aircraft and the missile capable of receiving a coded signal and synchronizing the coded signal so as to extract therefrom the information desired.

Still another object of the invention is to provide a range computer which can receive a coded signal and compare that received coded signal to a generated signal to compute the range from aircraft to missile.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
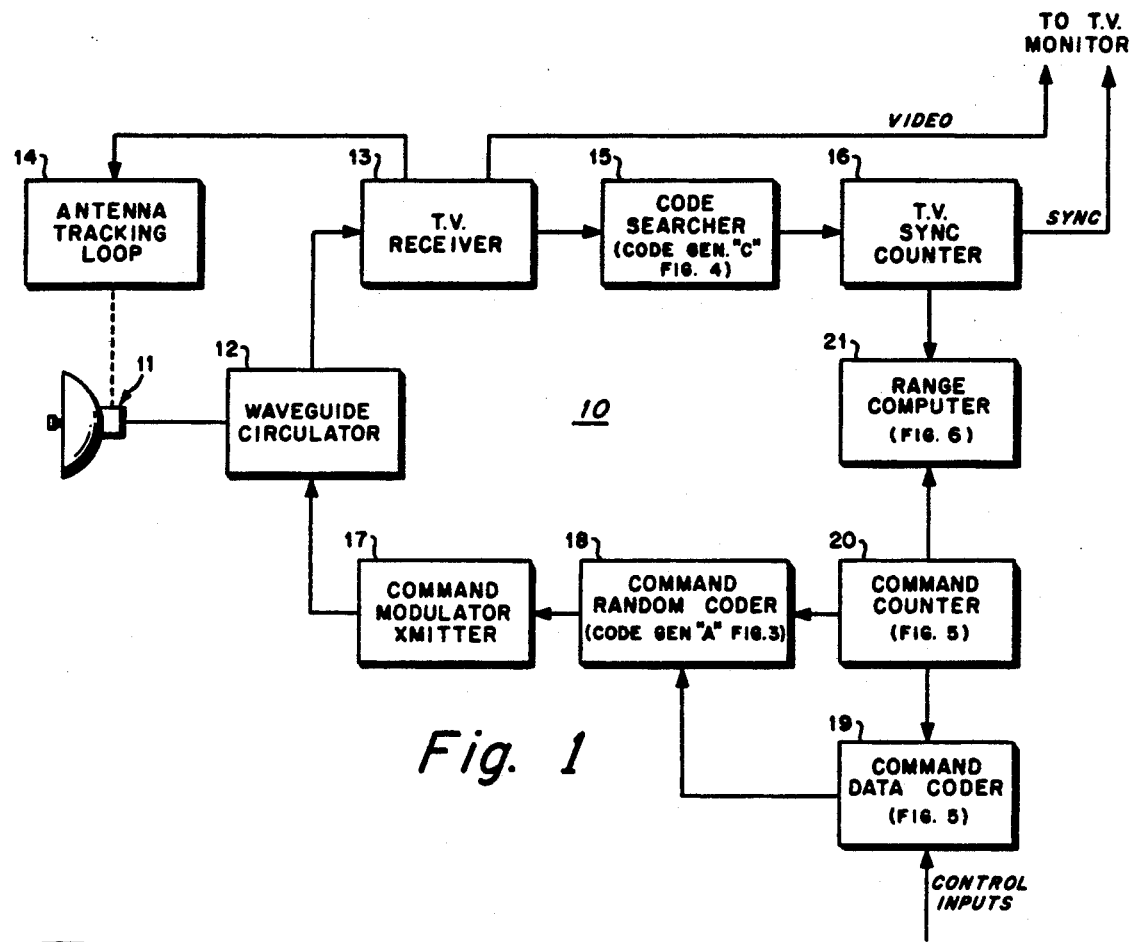
FIG. 1 shows a block diagram of a system in a guidance aircraft according to the present invention.

Referring now to FIG. 1, the guidance aircraft contains a communications system 10 having a tracking antenna 11, a circulator 12, a receiver 13, and an antenna tracking loop 14. The antenna tracking loop 14 serves to keep the tracking antenna 11 aimed in the direction of the missile. The television receiver 13 sends a signal to a code searcher 15, to be described in detail in connection with FIG. 4 below, and which sends a synchronized signal to a television sync counter 16. The television receiver 13 and the television sync counter 16 send signals to a television monitor which is not shown, as the television system does not form a part of the present invention.

A transmitter 17 also is provided to broadcast to the missile by means of the tracking antenna 11. Signals are fed to this transmitter 17 from a command random coder 18 and a command data coder 19. The command random coder 18 and the command data coder 19 are controlled by a command counter 20. Command random coder 18 is described further below in connection with FIG. 3. Command data coder 19 is described in detail in connection with FIG. 5 below. The command counter 20 is also described in further detail in FIG. 5. A range computer 21 is also provided for comparing the transmitted and received signals to indicate the range of the missile. The computer is described in more detail in FIG. 7 below.

Figure 2:
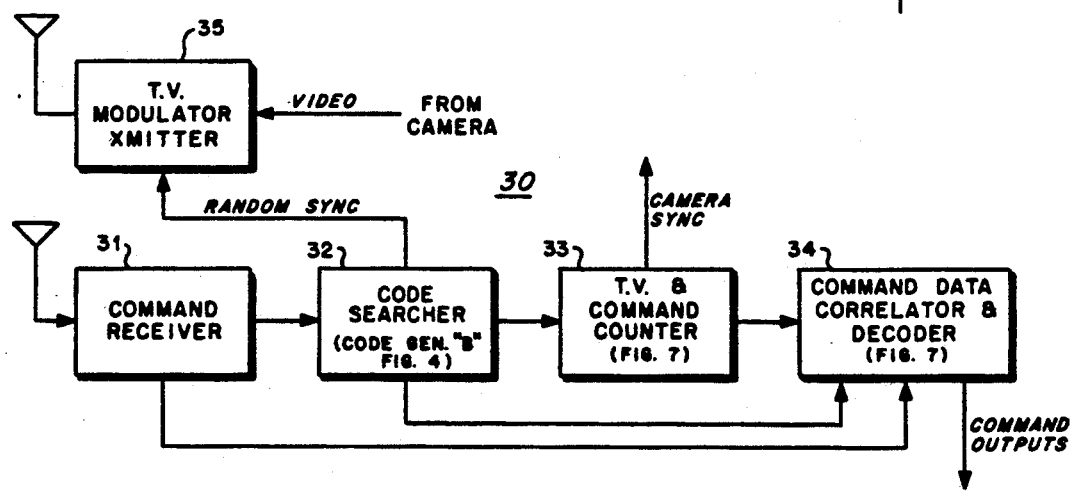
FIG. 2 shows a block diagram of a system contained in a missile according to the present invention.

Turning now to FIG. 2, the missile contains a transmit-receive system 30 having a command receiver 31, a code searcher 32, a TV and command counter 33, a command data decoder 34, and a TV modulator-transmitter 35. A received signal is passed on by command receiver 31 to the code searcher 32 and the command data decoder 34. Code searcher 32 passes to the TV and command counter 33 a generated code signal which is then passed to the command data correlator and decoder 34. The command data decoder 34 also receives from command receiver 31 the original signal for comparison purposes. The command outputs from command data decoder 34 operate the controls of the missile. Code searcher 32 also provides to TV modulator transmitter 35 a code train which is synchronized with the received code train from command receiver 31. The TV and command counter 33 also provides a synchronizing signal to the camera. The remainder of the camera and TV system in the missile is not shown as it provides no part of the present invention.

Figure 3:
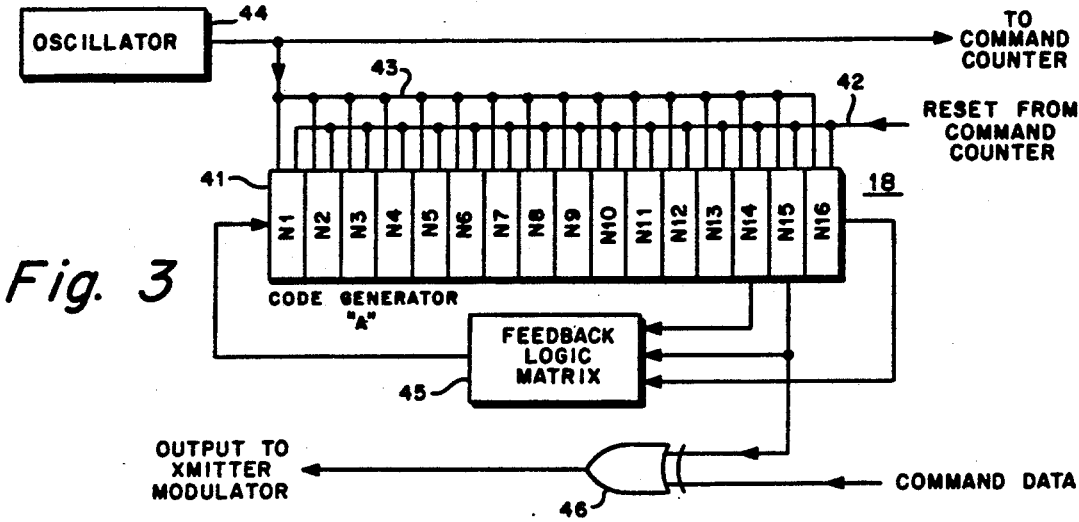
FIG. 3 shows a diagram of a command random coder contained in the aircraft system of FIG. 1.

In FIG. 3 there is shown the details of the command random coder 18 in the aircraft which generates the code which is used to control the entire system. A shift register 41 is provided which comprises a succession of sixteen flip-flop or storage elements. The construction of shift registers is known in the art. Basically each flip-flop element has two positions denoted as "1" and "0". A reset signal through line 42 will have the effect of setting all of the flip-flops at "0" except for "N1", which is set at "1". Clock pulses through shift bus 43 from oscillator 44 have the effect of transferring to each succeeding flip-flop whatever condition was on the previous flip-flop. In addition, a feedback logic matrix 45 is connected between certain of the flip-flops and the start of the sequence. The matrix 45 is shown as connected from the N14, N15, and N16 positions to the start. However, it may be connected instead from others. The matrix 45 itself will perform a number of operations in response to the condition of flip-flops N14, N15, and N16 and transfer to the first flip-flop in line a condition which depends ultimately upon the condition of whatever flip-flops are connected to the matrix 45. The ultimated result will be that the code generator 41 will issue from its next to last position a train of bits and nonbits referred to as "1" and "0" positions in which the number of "1"'s and "0"'s in the sequence are approximately equal. It will also be discovered that the sequence of "1"'s and "0"'s appears to have no discernible pattern over a significant length of the sequence and further that it takes approximately 65,536 bits to make up a complete sequence. This is what is known as a random code or pseudo random code. The train of bits from the next to last position is sent out to an "exclusive or" gate 46. Also into the same gate 46 is sent the command data from the command data coder 19. The command data will consist of a sequence of "1" and "0" conditions depending on the signal. The nature of the "exclusive or" gate is such that when the condition of the command data is "1", the code signal will be inverted, and when the condition of the command data is "0" the code will be transmitted through in its regular form. The term "inverted" or "inversion" as used herein means that whenever there is a bit in the input, there is no bit in the output and whenever there is no bit in the input, there is a bit in the output. It will be noted further that a bit or a "1" as used herein may be either a positive bit or a negative bit. As used herein, a bit is a signal which remains constant throughout its period, as opposed to a pulse which falls off after its initial occurrence. A succession of bits will have the appearance of a substantially constant voltage level.

Bits from gate 46 are sent to the transmitter-modulator 17 which frequency modulates the carrier frequency which is sent out through the antenna. Pulses from clock oscillator 44 are sent not only to shift bus 43 but to the command counter 20 which will be described subsequently in connection with FIG. 5. Command counter 20 periodically sends reset signals to each of the storage elements in the shift register 41 which starts the code over again at the beginning of the sequence. Command counter 20, therefore, provides the control of code generator A.

Although the operation of the data coder is described in connection with an anti-jamming system, the data coder of the present system has utility also in a system in which jamming is not a problem. In such a system the output of the data coder will be sent directly to the transmitter without the use of a random coder. The transmitter may use any of various forms of frequency or amplitude modulation. The form in use is frequency shift key modulation, in which the "1" and "0" conditions cause alternation between two frequencies. Other forms of modulation may be used, such as phase shift keyed modulation.

Figure 4:
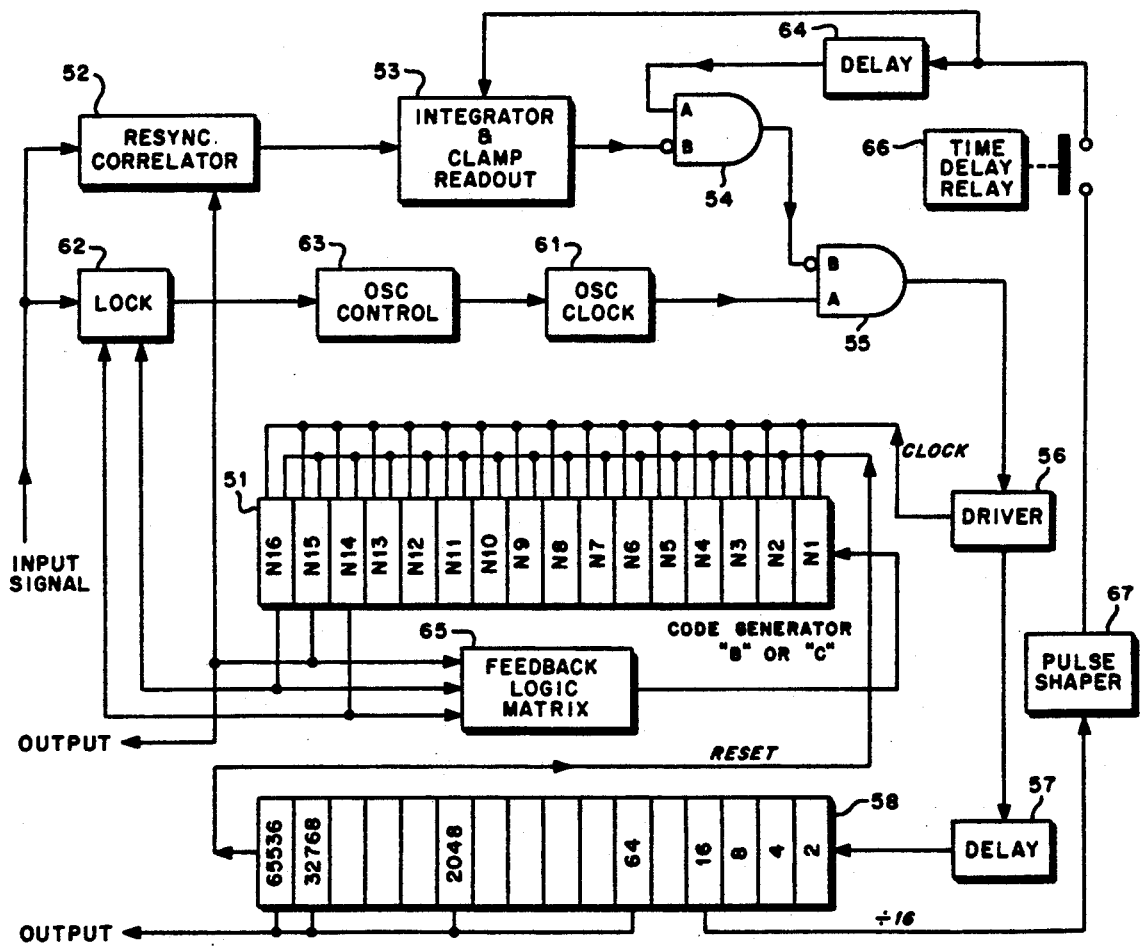
FIG. 4 shows a diagram of a code searcher of either the aircraft system of FIG. 1 or the missile of FIG. 2.

Turning now to FIG. 4, there is shown the code searcher mechanism. This mechanism is identical for the code searcher 15 of the aircraft and the code searcher 32 of the missile system. In the code searcher a code generator which comprises a shift register 51 is provided. This will be code generator B in the missile system and code generator C in the code searcher mechanism in the aircraft. This code generator 51 is set up to generate a code identical to the code generated in the first code generator 41. However, it will be noted that the code generated by generator 51 will not necessarily be in phase with the received signal from code generator 41 and, therefore, a mechanism must be provided to synchronize the output from generator 51 with the received signal. The input signal from the receiver is sent into a resync correlator 52 into which is also sent the sequence from code generator 51. In the first instance the two codes may or may not be matched but in all probability will not be matched. The characteristic of resync correlator 52 is such that it sends out a signal of one polarity if the bits coming in are matched and a signal of the opposite polarity if the bits coming in are not matched. Correlator 52 is a common logic device and needs no description here. The output of the correlator is sent into an integrator and clamp readout 53 which sums the output of correlator 52 over a period of sixteen bits. The integrator may be a simple device for receiving a net charge such as, for example, a capacitor. The clamp readout will make a decision as to whether the charge has achieved a significant level and will send an output pulse if it has and no output pulse if it has not. If it is assumed that the two trains coming in through the resync correlator were not matched originally, the integrator 53 will over a period of sixteen bits receive as many bits of one polarity as of the other polarity and the charge on the integrator will be in the neighborhood of zero, thereby causing no pulse to read out at the end of sixteen input pulses. Only in the event that there is substantial correlation between the bits coming in over the period of sixteen bits will there be an output from the integrator and clamp readout 53. In the missile, the readout 53 will have to respond to a significant charge of either polarity, since when the data bits are modulating the code, it is inverted, and there will be perfect mismatch, i.e. substantially all the bits out of the correlator 52 will be of the reverse polarity. The readout from integrator and clamp readout 53 is passed to an "inhibit and" gate 54 which, as indicated, will produce an output pulse when there is an input pulse on A and no input pulse on B simultaneously. The output from this "inhibit" gate is sent to a second "inhibit and" gate 55 which will produce an output pulse when there is no pulse on B and a pulse at A simultaneously. The condition of pulse or no pulse is sent to a driver 56 which sends a succession of clock pulses back to code generator 51 and also through a delay 57 to a counter 58. The counter 58 periodically provides a reset pulse to the code generator 51 through a pulse shaper (not shown). Counter 58 is a sixteen stage binary counter which will at the end of it divide the incoming pulses by 65,536 to provide a reset pulse. It will also provide various other outputs by selection of the stage at which the output is taken. The square wave edges which occur on counter 58 at every sixteenth pulse are taken out from the fourth stage of the counter, changed to pulses by pulse shaper 67, and sent back to the clamp readout 53 to cause the clamp readout to discharge.

The operation of the code searcher is as follows. In the ordinary operation of the device an oscillator clock 61 provides a succession of pulses at the original frequency to "inhibit and" gate 55. Assuming that there is no pulse input to point B of gate 55 there will be succession of output pulses to driver 56 which will continue to drive the code generator 51. If the two signals going into resync correlator 52 are in synchronization the clamp readout 53 will read out a pulse every sixteen input bits and gate 54 will refuse to put out a pulse when there is an output pulse from clamp readout 53. Gate 54 also will not put out a pulse when there is no pulse on point A, so that during the first fifteen pulses of sixteen pulses when there is no pulse from the counter 58, gate 54 will have no output. So long as there is no output from gate 54, gate 55 will be satisfied and there will be a succession of clock pulses out to driver 56. So long as two signals are in synchronization the pulses from oscillator clock 61 will continue to be passed through to the code generator 51 without change. However, if the two signals coming into resync correlator 52 are not in synchronization there will be no output from clamp readout 53. If there is a pulse into point A of gate 54 and no pulse into point B, gate 54 will be satisfied and there will be an output pulse into point B of gate 55. An output pulse into point B of gate 55 will close that gate due to its characteristics and there will be momentarily no pulse into driver 56. This means the code generator 51 will be held for one clock pulse in its sequence of operation. So long as there is no synchronization between the two signals coming into resync correlator 52 code generator 51 will continue to be held for one clock pulse after every sixteenth clock pulse. In some circumstances the mechanism may have to go around almost the entire sequence in order to find a match. However, since the frequency of the input pulses is in the neighborhood of two megacycles and since it runs through the entire sequence thirty times a second the theoretical maximum amount of time it can take to synchronize the two signals is one-half second. Once the system is in phase it will be locked in phase by lock 62. Lock 62 has a pair of correlators like correlator 52 which receive signals from the stages of code generator 51 just before and just after the one that goes to resync correlator 52. Lock 62 also contains an integrator. If the signals from either of these stages begin to correlate with the input, signal lock 62 will send a signal to oscillator control 63 which will cause the oscillator clock 61 to momentarily speed up or slow down to bring it back in phase.

Due to the nature of clamp readout 53 the readout pulse is delayed from the incident pulse by a short period of time and, therefore, it is necessary to delay the pulse being led into point A of gate 54. This is accomplished by delay means 64. A feedback logic matrix 65 is provided for code generator 51. This matrix 65 is identical to matrix 45 in code generator 41. It is by this means that the two code generators 51 and 41 are caused to issue the same sequence of bits. Also is provided a time delay relay 66 which is actuated upon the launch of the missile from the aircraft providing a brief connection of the system to synchronize the input signal with the sequence generated by code generator 51. After a short period of time, normally about two seconds, the relay 66 suspends the operation of the resync correlator and thereafter the system is held in position by lock 62. Lock 62 is capable of controlling the system within one bit deviation on each side. If by some chance the system gets out of phase by more than one bit the operator may reconnect the resync correlator to go through the search again. In the missile code searcher the relay is in operation for the time of synchronization and then disconnected. It is reconnected in response to a signal from the aircraft. Outputs may be taken from counter 58 which will be divisions of the original frequency according to the stage from which they are taken. There will also be an output from the next to last stage of counter 58 in the missile only which will be sent to the TV synchronizer and the command data decoder.

Figure 5:
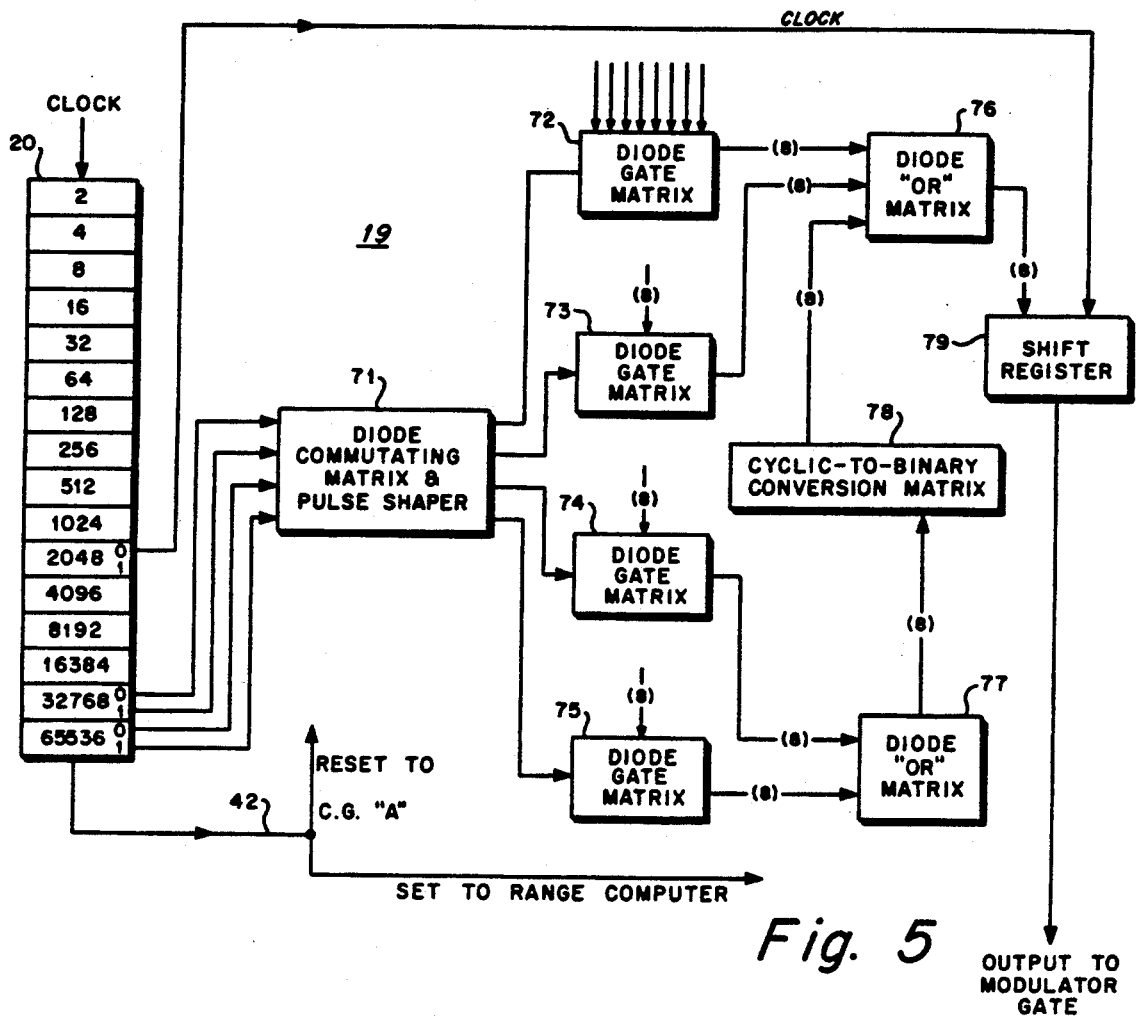
FIG. 5 shows a diagram of a command data coder of the aircraft system of FIG. 1.

The command data coder 19 is shown in FIG. 5. Command counter 20 is actuated by clock pulses from oscillator 44. In the last two stages, there are four possible combinations of the "0" and "1" which are fed to a diode commutating matrix and pulse shaper 71. Each of these combinations will occur once in each cycle of counter 20. Upon the occurrence of each combination, a pulse is sent out to one of four diode gate matrices 72, 73, 74 and 75. The signals into diode gate matrices 72 and 73 are on-off command signals. Upon the occurrence of a pulse from matrix 71, matrix 72 or 73 will discharge its signals through eight parallel lines into a diode "or" matrix 76. These signals will then be passed through eight parallel lines simultaneously into the eight stages of a shift register 79. Shift register 79 receives clock pulses from counter 20 through a pulse shaper (not shown) which cause the contents of register 79 to be read out serially. The pulse from matrix 71 which causes matrix 72 or 73 to place its contents on register 79 must occur between two clock pulses from counter 20. Eight clock pulses come from counter 20 to register 79 for each pulse from matrix 71. The signals into matrices 74 and 75 are cyclic type codes or Greg codes resulting from proportional commands, 74 for up-and-down signals for the missile, and 75 for right-and-left signals. These signals go to a diode "or" matrix 77 which feeds them into a cyclic-to-binary conversion matrix 78 which converts them into binary codes. These binary signals go out through eight parallel lines simultaneously to matrix 76 and then into shift register 79, upon the occurrence of a pulse from matrix 71. Matrix and pulse shaper 71, therefore, operates in response to each of the four combinations on counter 20 to send a pulse in turn to each of the four matrices 72, 73, 74, and 75 to discharge its contents in a single shot onto shift register 79, after which shift register 79 is serially discharged by clock pulses from counter 20. The output from register 79 will be a succession of code bits comprising "1"s and "0"s. However, these bits will be equal in length to approximately 2048 of the random code bits. The command code output from register 79 is then sent to "exclusive or" gate 46 shown in FIG. 3. Because of the nature of the gate 46 a "1" from the command data coder 19 will cause the code signal from generator 41 to be inverted for approximately 2048 bits and a "0" from the command data coder 19 will cause the code signal from generator 41 to pass through uninverted for approximately 2048 bits. The code train passed through gate 46 is then sent to transmitter 17.

A reset signal from the last stage of counter 20 is sent back to the reset point of all of the stages of code generator 41, and because of this, code generator 41 is automatically in key with command counter 20, and command counter 20 becomes the controlling counter for the entire system.

Figure 6:
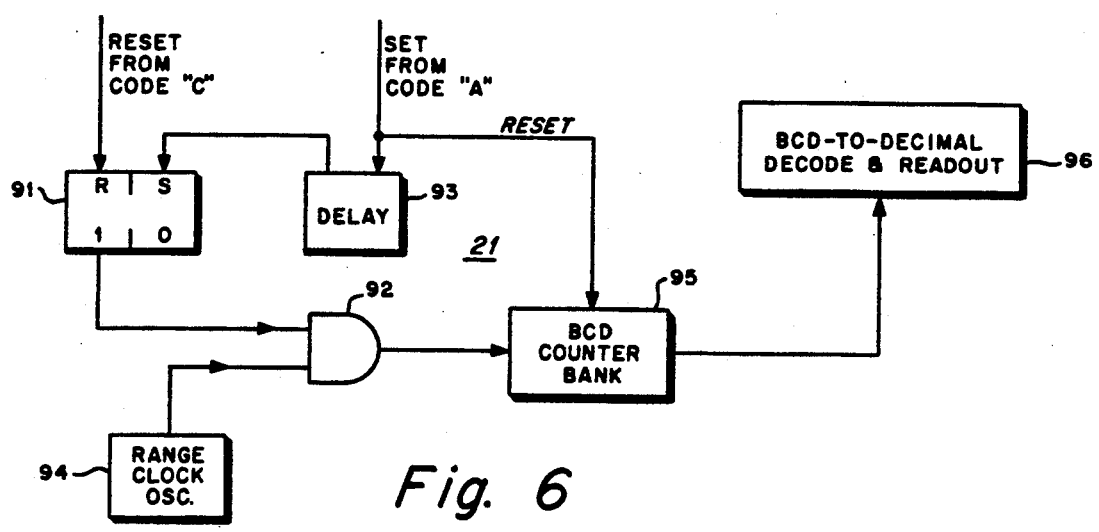
FIG. 6 shows a diagram of a range computer in the aircraft system of FIG. 1.

Range computer 21 is shown in FIG. 6. A flip-flop element 91 provides a "1" or "0" condition to "and" gate 92. The same reset signal that comes from counter 20 to code generator A goes also to the set point of flip-flop 91. A reset signal which comes from the last stage of counter 58 which in the aircraft controls code generator C comes to the reset point of flip-flop 91. When a signal comes to the set point of flip-flop 91 it is turned to a "1" condition, and when the reset signal comes to the reset point from code C it is turned to "0" again. A range clock oscillator 94 issues a series of pulses into "and" gate 92 while flip-flop 91 is turned on by the set signal from code A. These pulses from oscillator 94 will pass through gate 92 and the gate will be shut off again by the reset signal from code C. The frequency of oscillator 94 is chosen according to the desired range resolution. For example, a frequency chosen of around 81 K.C. for oscillator 94 will provide a minimum resolution of one nautical mile. The stream of pulses from oscillator 94 which is allowed to pass through gate 92 is counted by binary coded decimal counter bank 95. This counter bank 95 will count up the pulses passed during the interval of the reset from codes A and C and this count will be sent to the decode 96 where a readout will be expressed either in analog or decimal form which expresses the count on the B C D counter bank 95. The set signal from code A is also sent to bank 95 to reset it. To insure that bank 95 is reset before gate 92 opens, there is a small delay 93 in the line into the set point of flip-flop 91. If the frequency of oscillator 94 is about 81 K.C. as mentioned, each counted pulse will equal one mile range. If the frequency is about 162 K.C. each pulse will equal one-half mile range. Of course, one may set the frequency of oscillator 94 at whatever resolution one desires so long as readout 96 is calibrated accordingly.

Figure 7:
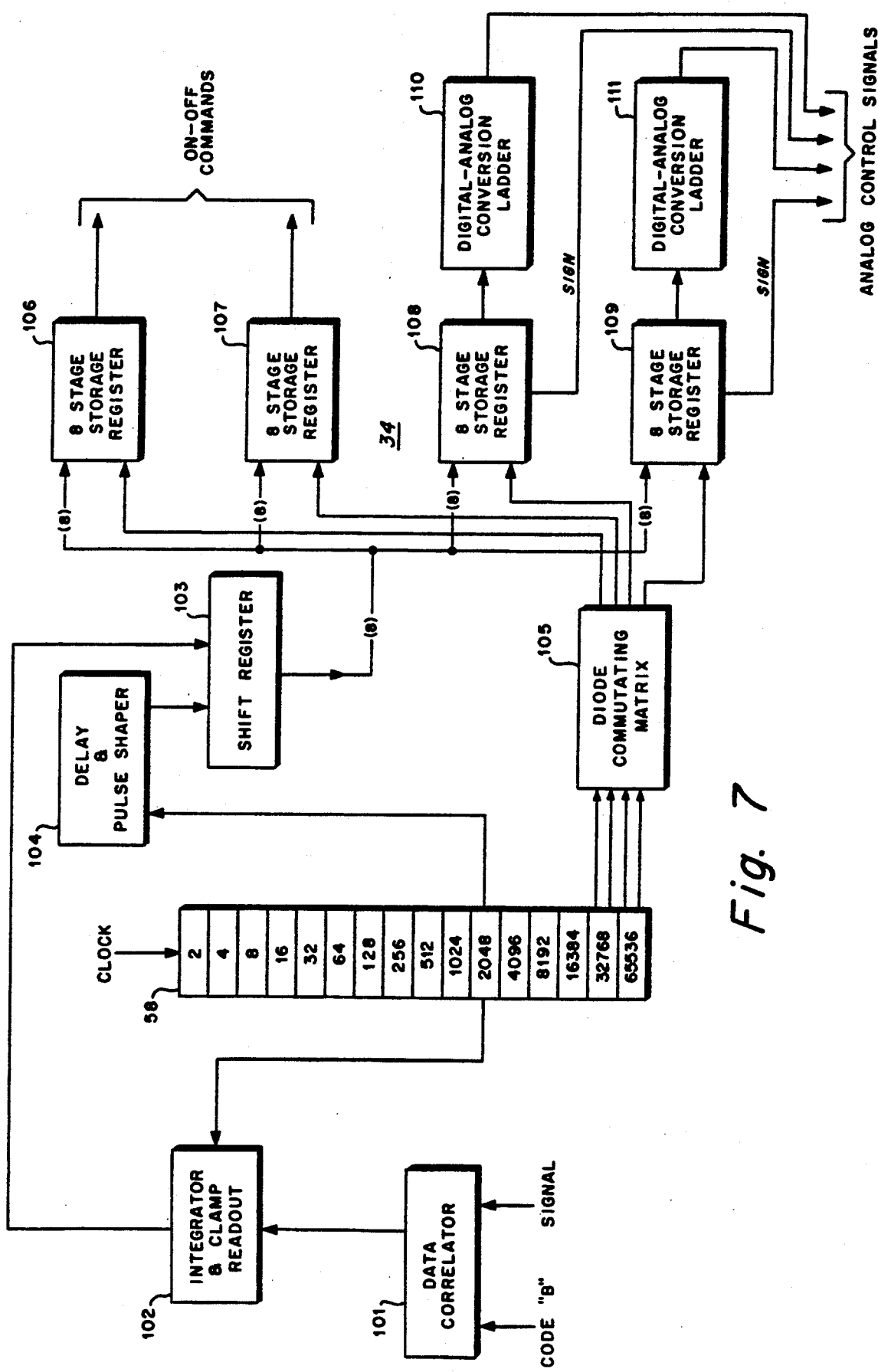
FIG. 7 shows a diagram of a command data decoder in the missile system of FIG. 2.

Command data decoder 34 in the missile is shown in FIG. 7. Command data decoder 34 is controlled by counter 58, which is also the counter which controls code generator 51 as shown in FIG. 4. In the case of the missile, code generator 51 is generator B. A data correlator 101 receives two signals, one from code B which is synchronized with the incoming signal, and the signal itself. The characteristics of this data correlator are the same as the resync correlator 52. The output from correlator 101 is fed into readout 102 which receives a readout pulse from counter 58 once every 2,048 code pulses. Because of the synchronization of code generator B with the incoming signal these readout pulses once every 2,048 code pulses are in phase with the data pulses, so that the output of the integrator and clamp readout should be a very emphatic one or a very emphatic zero. These command signals are transferred to a shift register 103 which also receives clock pulses of the same period through delay and pulse shaper 104. As with the data coder there is in the data decoder a diode commutating matrix 105 which is controlled by the condition of the last two stages of the counter 58 just as matrix 71 was controlled by counter 20. Matrix 105 will then enable each of four eight-stage storage flip-flop registers 106, 107, 108, 109 to receive sequentially the command information. Shift register 103 will store the information in the form of "1"s and "0"s and diode commutating matrix 105 will distribute them in one shot through eight lines to each of the eight stages of each of the four registers 106–109 sequentially. The registers 106 and 107 are then in condition to present to the missile sixteen on-off type commands while registers 108 and 109 feed into digital-analog conversion ladders 110 and 111. The binary codes entering ladders 110 and 111 are converted by the ladder into analog signals proportional to the sum of the values of the binary signals. One of the signals out of each register 108, 109 is a sign signal for an indication of whether the signal is up or down, in the case of 110, and right or left, in the case of 111. These bypass the ladders 110, 111. This provides up to 127 separate levels of amplitude, right, left, up and down. The last of the eight bits is distorted by the timing of the commutating pulses. The same occurs in registers 106 and 107. These are generally not used, which leaves 63 levels of amplitude in the proportional controls. It will be noted that one of the on-off signals from flip-flop 106 or 107 is led to the time delay relay in the command random decoder 32 in the event that the operator should desire to have the searcher 32 in the missile resynchronized.

In the operation of the system code generator A generates a signal which is modulated by the command data coder 19. This is in turn used to modulate the carrier frequency of the transmitter which broadcasts it to the missile. The missile receives the train of bits from the aircraft and decodes them. The received signal is used to synchronize code generator B, and the output from code generator B is used with the received signal to produce the data bits which are then sent to the command output. The signal from code generator B is also sent to the transmitter in the missile where it frequency modulates the carrier and is sent back to the aircraft. Since video from the camera in the missile is also being sent back to the aircraft it is generally the case that the code generator bits are sent back only during the blank periods from the picture. Because of the operation of the locking means in the missile and in the aircraft these are generally sufficient to keep the three code generators all synchronized. Since code generator B is synchronized with the signal which it receives from A, and since code generator C is synchronized with the signal which it receives from the missile code generator B, code generator C will lag behind code generator A by the time which it takes the radio waves to travel from the aircraft to the missile and back to the aircraft. If the clock frequency in the range computer in the aircraft is set at 80.911 kc, the time between two pulses of the oscillator is exactly equal to the round trip time for a distance of one nautical mile.

The resync correlators are generally placed in use at launch and are usually effective to achieve synchronization of the three code generators within a half second. Thereafter, the lock means in the missile and aircraft will be effective to hold them in synchronization.

By means of the present coding apparatus vastly improved protection against jamming is provided, because the command random decoder in the missile pod will respond only to the code for which it is set, which is the same as the code issuing from the aircraft. Because of the correlating and integrating means an interfering signal must be substantially above the signal from the aircraft in order to effect a dislocation of the decoder from the received coding signal. Since the cycle of the code uses in the neighborhood of 65,000 pulses the chances of an unfriendly power hitting upon the code and sending spurious signals without very expensive equipment is extremely remote. The sequence of the code for anything less than the full cycle has all the appearance of being completely random. Another advantage of this system is that in the event there are several missiles operating in the same neighborhood from different aircraft they will not interfere with each other even though they may be on the same frequency and pulse repetition rate, since their codes will be different.

It will be understood, of course, that the particular numbers and frequencies of operation recited are only examples. There may, for example, be more or less than sixteen stages in the counters and code generators, which will effect the length of the code cycle. The data bits may be more or less than 2,048 code bits long, it being only advisable that they be some integral division of the code cycle. Similarly, more or less than sixteen code bits may be integrated to provide the synchronization of the code. Using less than sixteen will increase the chances of spurious synchronization. Using more than sixteen will increase the accuracy and precision of the synchronization but will cause it to take a longer time to go a full cycle. Feedback may be provided in the counters, which will shorten the length of the cycle, as well as the length of various subdivisions. More than four channels of information may be sent and received if the conditions of more than the last two stages of the counter are considered. If the last three stages are considered, for example, one may have eight channels rather than four, which will require eight storage registers in the missile and eight diode gate matrices in the data coder.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A random code searcher for synchronizing a random code generator with an incoming sequence of code bits comprising:
   an oscillator clock;
   a code generator preset to issue a particular sequence of code bits and driven by pulses from said oscillator clock;
   means to compare an incoming sequence of code bits with said sequence of code bits from said code generator and express an output as a function of correlation or noncorrelation of said two sequences;
   means to interrupt the pulses driving said code generator periodically in response to a noncorrelation signal from said means to compare said code sequences;
   a counter driven by the pulses driving said code generator for periodically providing a reset signal to said code generator;
   means for periodically sampling the output from said means to compare said code sequences and issuing a correlation or noncorrelation signal in response thereto; and
   logic means for passing or interrupting pulses from said oscillator clock to said code generator and said counter means in response to the correlation or noncorrelation signal from said means for periodically sampling.

2. A random code searcher as recited in claim 1 further comprising:
   means to send a sampling pulse to said means for periodically sampling in response to a predetermined condition of said counter, whereby said means for periodically sampling will issue a correlation or noncorrelation signal upon incidence of said sampling pulse.

3. A random code searcher as recited in claim 2 wherein:
   said logic means comprises a first gate which closes in response to a signal from said means for periodically sampling indicating noncorrelation.

4. A random code searcher as recited in claim 3 further comprising:
   a second gate in said logic means receiving signals from said means for periodically sampling and from said predetermined portion of said counter means;
   said second gate passing to said first gate said gate closing signal in response to coincidence of a noncorrelation signal from said means for periodically sampling and said sampling pulse from said counter.

5. A random code searcher as recited in claim 1 wherein said sampling means comprises:
   correlation means having a positive and a negative output voltage level and adapted to attain a level of one polarity if the incoming code bits match and a level of the opposite polarity if they do not;
   means for summing the output from said correlation means over a predetermined period of time; and
   means for periodically detecting the level of said summing means and issuing a correlation or noncorrelation signal in response to said level.

6. A random code searcher as recited in claim 5, wherein said
   detecting means comprises:
   a clamp means for comparing said level on said summing means to a predetermined level and issuing a correlation signal upon attainment of said level in response to a sampling pulse; and
   said searcher further comprising:
   means to send a sampling pulse to said clamp in response to a predetermined condition of said counter.

7. A random code searcher as recited in claim 6, wherein:
   said logic means comprises a first gate which closes in response to a noncorrelation signal from said sampling means.

8. A random code searcher as recited in claim 7, further comprising:
   a second gate in said logic means receiving signals from said sampling means and from said predetermined portion of said counter means; said second gate passing to said first gate said gate closing signal in response to coincidence of a noncorrelation signal from said means for periodically sampling and said sampling pulse from said counter.

9. A command data coder comprising:
   a counter;
   first means dividing a cycle of said counter by a predetermined amount;
   second means dividing said cycle by an integral multiple of said first predetermined amount;
   a set of matrices equal in number to said predetermined amount, each matrix having a number of positions equal in number to said integral multiple and a plurality of inputs adapted to receive a set of command signals;
   a shift register having a number of positions equal in number to said integral multiple;

means for sending to each matrix once in each cycle a pulse actuated by said counter for causing the set of commands placed on that matrix to be placed on said shift register; and means connecting said second means to said shift register to cause said shift register to issue serially an output in the form of a code train expressive of the commands placed on said matrix.

10. A command data coder as recited in claim 9, wherein:

each position in said matrix is linked with a single position in said shift register.

11. A command data decoder comprising:

a counter having a first output dividing a cycle of said counter by a predetermined amount and a second output dividing said cycle by an integral multiple of said predetermined amount;

a shift register having a number of positions equal to said integral multiple of said predetermined amount for receiving a sequence of command signals equal in number to said integral multiple of predetermined amount, each of said signals being received by the stages of said shift register in response to the occurrence of one division of the cycle of said counter;

a plurality of storage means each having a number of storage stages equal to said integral amount;

means responsive to the first output of said counter for sequentially enabling each of said plurality of storage means for receiving said command signals; and means responsive to a predetermined condition of the cycle of said counter to cause the storage means to receive the contents of said shift register, said storage means producing output signals corresponding to the condition of said storage stages.

12. A command data decoder as recited in claim 11 further comprising:

means providing said command signals to said shift register in response to the second output of said counter.

13. A command data decoder comprising:

a counter having first and second outputs, said first output dividing a cycle of said counter by a predetermined amount and said second output dividing a cycle of said counter by an integral multiple of said predetermined amount;

a shift register having a number of stages equal to said integral multiple of said predetermined amount;

storage means having a number of storage stages equal to said integral multiple of said predetermined amount;

means providing command signals to said shift register in response to the second output of said counter; and means responsive to the first output of said counter for sequentially enabling said storage means to receive said command signals.

14. A command data decoder as recited in claim 13 wherein said means providing command signals comprises:

a data correlator providing an output signal which is a measure of the correlation or noncorrelation of signals applied to its input; and integrator means receiving the output of said data correlator and responsive to the second output of said counter for providing said control signals to said shift register.

* * * * *